United States Patent
Li et al.

(10) Patent No.: US 8,797,987 B2
(45) Date of Patent: Aug. 5, 2014

(54) NETWORK REENTRY OF MACHINE-TO-MACHINE DEVICES

(75) Inventors: Honggang Li, Beijing (CN); Rui Huang, Beijing (CN); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/512,509

(22) PCT Filed: Nov. 30, 2011

(86) PCT No.: PCT/US2011/062740
§ 371 (c)(1),
(2), (4) Date: May 29, 2012

(87) PCT Pub. No.: WO2012/154210
PCT Pub. Date: Nov. 15, 2012

(65) Prior Publication Data
US 2014/0056229 A1    Feb. 27, 2014

Related U.S. Application Data

(60) Provisional application No. 61/484,105, filed on May 9, 2011.

(51) Int. Cl.
| | |
|---|---|
| *H04W 80/04* | (2009.01) |
| *H04W 88/06* | (2009.01) |
| *H04W 28/04* | (2009.01) |
| *H04W 72/04* | (2009.01) |
| *H04W 36/18* | (2009.01) |

(52) U.S. Cl.
USPC .......................................... 370/329; 370/331

(58) Field of Classification Search
CPC ..... H04W 80/04; H04W 88/06; H04W 28/04; H04W 72/04; H04W 36/18
USPC .......................................... 370/328, 329, 331
See application file for complete search history.

(56) References Cited

U.S. PATENT DOCUMENTS

| | | |
|---|---|---|
| 2009/0191857 A1 | 7/2009 | Horn et al. |
| 2009/0217348 A1 | 8/2009 | Salmela et al. |
| 2011/0051697 A1 | 3/2011 | Wang et al. |
| 2013/0058311 A1* | 3/2013 | Park et al. ..................... 370/331 |

OTHER PUBLICATIONS

Mahmoud et al, "Initial Ranging for WiMAX (802.16e) OFDMA," WiMAX 802.16, University of South Florida, Jun. 15, 2006,Tampa, FL, 8 pages.
International Search Report mailed Apr. 10, 2012 from International Application No. PCT/US2011/062740.
International Preliminary Report on Patentability mailed Nov. 21, 2013 from International Application No. PCT/US2011/62740.

* cited by examiner

*Primary Examiner* — Ronald Abelson
(74) *Attorney, Agent, or Firm* — Schwabe, Williamson & Wyatt, P.C.

(57) ABSTRACT

Embodiments of the present disclosure describe device, methods, computer-readable media and system configurations for establishing a reentry procedure for a machine-to-machine ("M2M") device to reenter a wireless communication network based on traffic pattern characteristics or mobility characteristics associated with the M2M device. In various embodiments, a wireless communication device may include a processor, a wireless communication interface, memory coupled to the processor, and a control module. The control module may be operated by the processor and configured to establish a reentry procedure for a machine-to-machine ("M2M") device to reenter a wireless communication network based on traffic pattern characteristics or mobility characteristics associated with the M2M device. Other embodiments may be described and/or claimed.

30 Claims, 6 Drawing Sheets

|  | KNOWN TRAFFIC PATTERN | UNKNOWN TRAFFIC PATTERN |
|---|---|---|
| FIXED | • GROUP PAGING AS POLLING, CELL WIDE OR MULTI-CELL WIDE<br>• DEDICATED RANGING CHANNEL ALLOCATION FOR CONTENTION-FREE ACCESS<br>• RANGING PROCESS, WITH OR WITHOUT RANGING CODE; IF NO RANGING CODE SENT, DEDICATED RANGING CHANNEL | • COMMON OR DEDICATED RANGING CHANNEL ALLOCATION FOR CONTENTION-BASED ACCESS<br>• RANGING PROCESS, WITH OR WITHOUT RANGING CODE; IF NO RANGING CODE SENT, DEDICATED RANGING CHANNEL |
| MOB-ILE | • GROUP PAGING AS POLLING, MULTI-CELL WIDE<br>• DEDICATED RANGING CHANNEL ALLOCATION FOR CONTENTION-FREE ACCESS | • COMMON OR DEDICATED RANGING CHANNEL ALLOCATION FOR CONTENTION-BASED ACCESS |

Fig. 1

NETWORK REENTRY OF MACHINE-TO-MACHINE DEVICES

CROSS REFERENCE TO RELATED APPLICATIONS

The present application is a national phase entry under 35 U.S.C. §371 of International Application No. PCT/US2011/62740, filed Nov. 30, 2011, entitled "NETWORK REENTRY OF MACHINE-TO-MACHINE DEVICES", which designates the United States of America, and which claims priority to U.S. Provisional Patent Application No. 61/484,105, filed May 9, 2011, the entire contents and disclosures of which are hereby incorporated by reference in their entireties.

FIELD

Embodiments of the present invention relate generally to the field of wireless transmission, and more particularly, to network reentry of wireless devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure. Unless otherwise indicated herein, the approaches described in this section are not prior art to the claims in the present disclosure and are not admitted to be prior art by inclusion in this section.

Machine-to-machine ("M2M") wireless machines or devices (hereafter referred to as "devices") may communicate primarily or exclusively with other machines or devices, with little or no human intervention. Examples of M2M devices may include wireless weather sensors, assembly line sensors, meters to track vehicles of a fleet, and so forth. In many cases these devices may log onto a wireless network and communicate with a network server, e.g., over the Internet. In parlance of the 3GPP Long Term Evolution ("LTE") Release 10 (March 2011) (the "LTE Standard"), M2M may alternatively be referred to as "machine type communications" ("MTC"). M2M devices may also be used with the IEEE 802.16 standard, IEEE Std. 802.16-2009, published May 29, 2009 ("WiMAX"), as well as in Third Generation ("3G") networks.

When an M2M device reenters a network, for example, after being in standby or idle mode, a typical network reentry process may include downlink synchronization, uplink synchronization using random access, channel allocation and registration. However, where a large number of M2M devices are to perform uplink synchronization using a random access mechanism, there may be collisions. These collisions may reduce uplink synchronization efficiency and ultimately, the network reentry efficiency.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIG. 1 schematically illustrates example network reentry procedures that may be established in various situations, in accordance with various embodiments.

DETAILED DESCRIPTION

Figure 2:
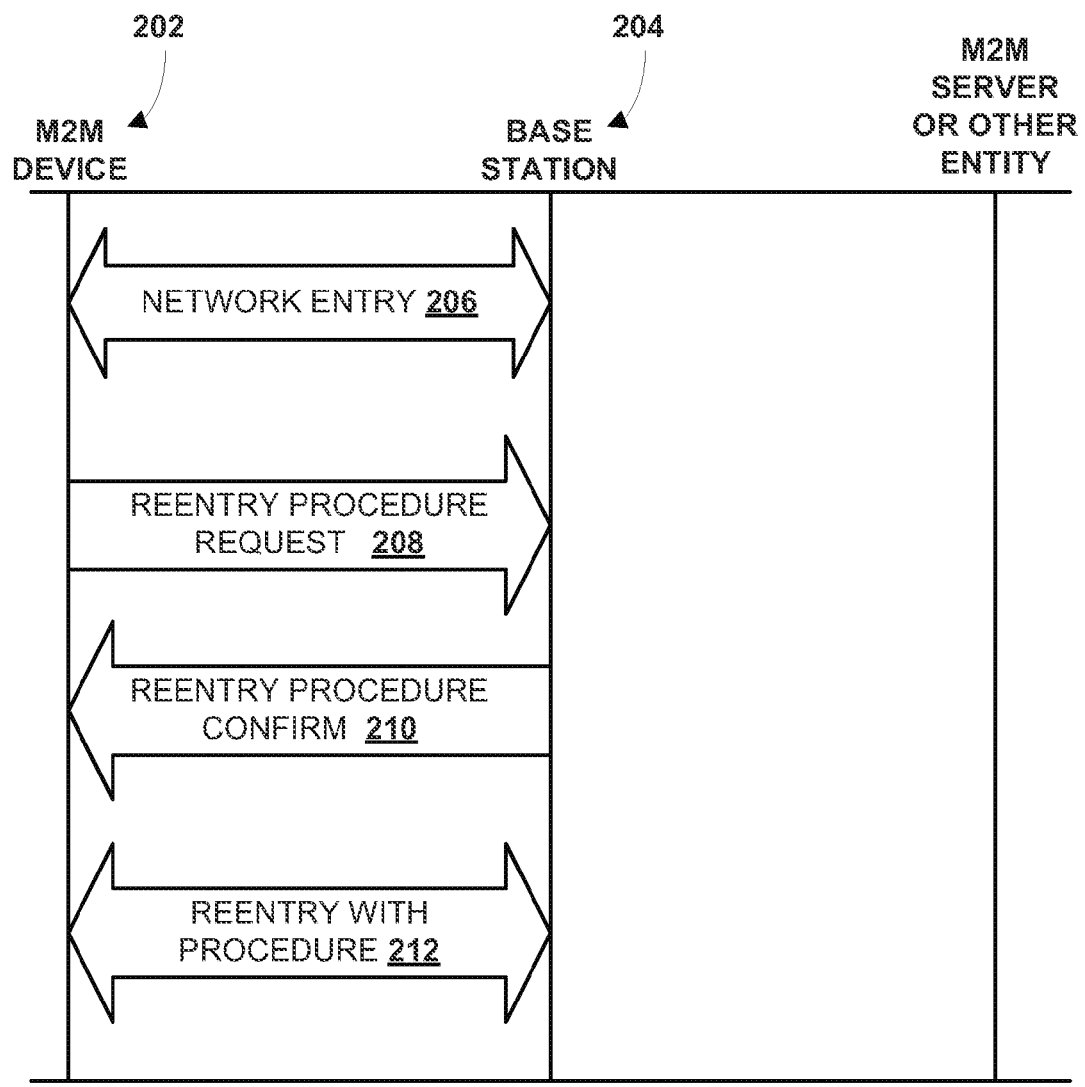
FIG. 2 schematically depicts establishment of an example network reentry procedure, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality. As used herein, "computer-implemented method" may refer to any method executed by one or more processors, a computer system having one or more processors, a mobile device such as a smart phone (which may include one or more processors), a tablet, laptop computer, a set-top box, a gaming console, and so forth.

In various embodiments, a wireless communication device may include a processor, a wireless communication interface, a memory coupled to the processor, and a control module to be operated by the processor. The control module may be configured to establish a reentry procedure for a machine-to-machine ("M2M") device to reenter a wireless communication network based on traffic pattern characteristics or mobility characteristics associated with the M2M device. Disclosed methods and other devices may be configured to perform similar operations.

FIG. 1 schematically illustrates an example plurality of network reentry procedures that may be established between an M2M device and a radio access node ("RAN") for reentry of the M2M device into a network, in accordance with various embodiments. Although examples herein refer mostly to terms related to the IEEE 802.16 standard, IEEE Std. 802.16-2009, published May 29, 2009 ("WiMAX"), similar techniques may be used in other wireless technologies, such as the 3GPP Long Term Evolution ("LTE") Release 10 (March 2011) (the "LTE Standard"). Thus, in LTE embodiments, the M2M device may be a user equipment ("UE") device and the RAN may be an evolved Node B ("eNB"). In WiMAX embodiments, the M2M device may be a mobile subscriber ("MS") and the RAN may be a base station ("BS").

Selection of a reentry procedure from those depicted in FIG. 1 may depend at least in part on traffic pattern characteristics and/or mobility characteristics associated with an M2M device. "Traffic pattern characteristics" associated with an M2M device may include uplink and/or downlink availabilities, typical network traffic bursts (e.g., high traffic at 5 pm every weekday), and so forth. "Known" traffic pattern characteristics may refer to traffic patterns that are observable and/or relatively predictable. "Unknown" traffic pattern characteristics may refer to traffic patterns that are unknown and/or less predictable.

If traffic pattern characteristics associated with an M2M device are known, a dedicated control channel (e.g., ranging channel in WiMAX, or a physical random access channel, or "PRACH," in LTE) may be allocated for contention-free use by the M2M device when reestablishing communication with a RAN. In various WiMAX embodiments, a dedicated ranging channel may be implemented for a group of M2M devices by allocating a particular ranging opportunity to the group to use. On the other hand, an M2M device with unknown traffic pattern characteristics may reenter the network in a contention-based manner. Additionally, an M2M device with known traffic pattern characteristics may implement a network reentry procedure that includes group paging as a polling mechanism. For example, a base station may poll one or more M2M devices that are members of a paging group to wake them up so that they may access a channel to implement a reentry procedure.

"Mobility characteristics" associated with an M2M device may refer to whether the M2M device is "fixed" or "mobile." In some embodiments, "fixed" may mean the M2M device is stationary relative to a RAN such as a base station with which it communicates. In other embodiments, "fixed" may more broadly encompass M2M devices that may be somewhat mobile relative to a RAN, but still relatively limited in movement range such that mobility is predictable, such as inside of a building or on a moving portion of an assembly line. Conversely, "mobile" may mean an M2M device may be carried anywhere (e.g., a cellular phone) or an M2M device of somewhat more limited range, such as a taxi meter that may only function within city limits. In some embodiments, mobility may be expressed as a range, with "fixed" on one end and "mobile" on the other, and numeric values in between representing a "degree" of mobility. Various thresholds along this range may be selected to differentiate mobile and fixed devices. In WiMAX embodiments, a fixed M2M device (mobile subscriber, or "MS") may utilize a ranging process, with or without a ranging code, to establish communication with a base station. If no ranging code is sent, then a dedicated ranging channel may be in use. In LTE embodiments, a PRACH channel may be used, with or without a random access preamble, to establish a connection with an eNB.

Returning to FIG. 1, if an M2M device is fixed and is associated with known traffic pattern characteristics then the network reentry procedure at the top left may be implemented. This network reentry procedure may include utilizing group paging for a polling mechanism. The top left reentry procedure may also include establishing a dedicated control channel allocation for contention-free access between one or more M2M devices and a RAN. This facilitates cooperative use of the dedicated control (e.g., ranging) channel by multiple fixed M2M devices, with reduced or no collisions. To identify the control channel, in various embodiments, a reentry procedure may include use by an M2M device of a ranging code such as a code division multiple access ("CDMA") code or a random access preamble. In other embodiments, no such code may be used. If no such code is used, a dedicated control channel, such as a dedicated ranging channel, may be established between one or more M2M devices and a RAN such as a base station.

If a mobility characteristic of M2M device is fixed and it has unknown traffic pattern characteristics, then the network reentry procedure at the top right may be implemented between the M2M device and a RAN. In WiMAX embodiments, either a common channel (e.g., allocated to all M2M devices) or dedicated ranging channel (e.g., allocated to one or more specific M2M devices) may be allocated, but because the traffic pattern experienced by the M2M device is unknown, in either case the access may be contention-based. As was the case with the top left reentry procedure, a ranging process may be used by the M2M device with or without sending a ranging code. If the M2M device does not send such a code, then a dedicated control channel such as a ranging channel may be established.

If an M2M device's mobility characteristics indicate that it is mobile and its traffic pattern characteristics are known, then the reentry procedure at the bottom left may be implemented. As was the case with a fixed M2M device with a known traffic pattern (top left), group paging may be implemented as a polling mechanism. However, because the M2M device's mobility characteristics indicate that it is mobile, the group paging may span one or more cells. Additionally, in WiMAX embodiments, a dedicated ranging channel may be allocated between the M2M device (e.g., MS) and the base station. Because the traffic pattern characteristics of the M2M device are known, contention-free access is possible.

If an M2M device's mobility characteristics indicate that it is mobile and it has unknown traffic pattern characteristics, then the network reentry procedure at the bottom right of FIG. 1 may be implemented. In WiMAX embodiments, either a common or dedicated ranging channel may be allocated for use by the M2M device and a base station. The access may be contention-based.

The network reentry procedure established between a RAN and an M2M device may be indicated in various ways. For example, in some WiMAX embodiments, the network reentry procedure may be indicated using an M2M network access type field (individual or group) of an advanced air interface AAI-PAG-ADV message. In some embodiments, a value of 0b00 may indicate a resource allocation (e.g., an assignment of an A-MAP offset) for an AAI-RNG-REQ message, a value of 0b01 may indicate dedicated ranging channel allocation in an AAI-PAG-ADV message, a value of 0b10 may indicate a dedicated ranging channel allocation in broadcast assignment A-MAP IE, and a value of 0b11 may indicate that no dedicated ranging channel is used. In the last option, the M2M device may use an allocation defined in an AAI-SCD message.

In some WiMAX embodiments, the network reentry procedure that is used between an M2M device and a RAN may additionally or alternatively be indicated using the M2M network access type field of a MOB_PAG-ADV message. In some embodiments, the M2M network access type field may be a type, length and value ("TLV") parameter of the MOB_PAG-ADV message.

An M2M device's mobility and traffic pattern characteristics may be determined in various ways. In various embodiments, a RAN such as a base station or eNB may receive, from an M2M device, data indicative of the traffic pattern characteristics or the mobility characteristics associated with the M2M device. In various embodiments, the RAN may pass this information along to other network entities, such as other base stations or eNBs in the same or different cells.

An example of this is seen in FIG. 2. An M2M device 202 and a base station 204 establish an initial network exchange (e.g., an "original" network entry) at 206. At 208, M2M device 202 may transmit a network reentry procedure request to base station 204. In various embodiments, this request may include data indicative of M2M device's 202 mobility and/or traffic pattern characteristics, as well as identification information such as a MAC address. Additionally or alternatively, M2M device 202 may decide which network reentry procedure is appropriate and request that reentry procedure from base station 204.

At 210, base station 204 may transmit a network reentry confirmation to M2M device 202. In various embodiments this may be a control message that indicates to M2M device 202 which network reentry procedure should be used, based on mobility and/or traffic pattern characteristics of M2M device 202. In some embodiments, this may be a confirmation of the network reentry procedure requested by M2M device 202.

At 212, which may occur later when M2M device 202 reenters a network, M2M device 202 and base station 204 may implement the selected network reentry procedure.

In various embodiments, a RAN such as a base station may receive data indicative of the traffic pattern characteristic or the mobility characteristic associated with the M2M device from another network entity, such as an M2M server. For example, if a particular M2M device (e.g., a taxi meter) regularly communicates with a particular M2M server (e.g., dispatch), the M2M server may be configured to collect data indicative of mobility and/or traffic pattern characteristics of the M2M device over time and provide that data to a RAN.

Figure 3:
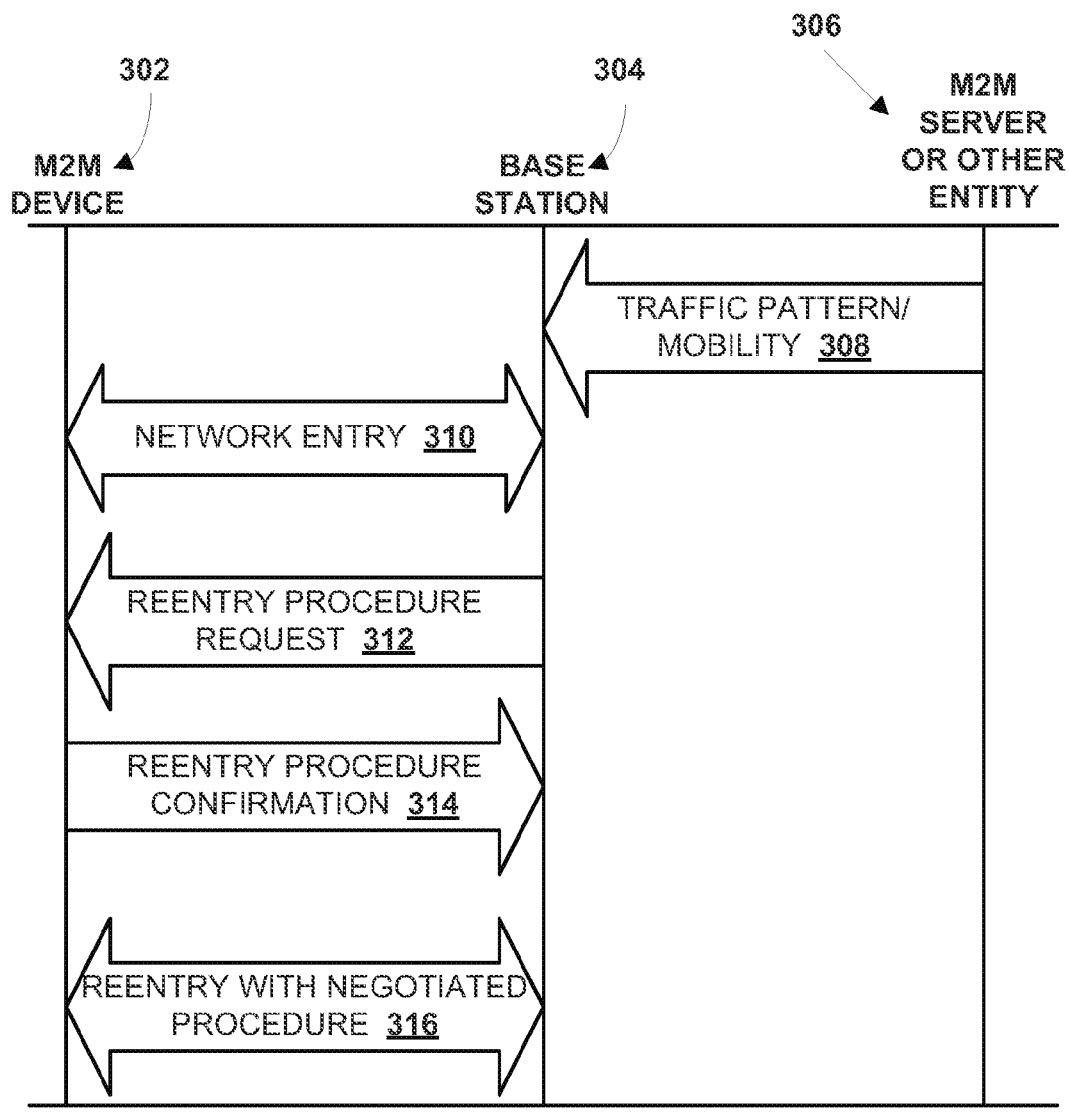
FIG. 3 schematically depicts establishment of another example network reentry procedure, in accordance with various embodiments.

An example of this is seen in FIG. 3, which shows communications that may occur between an M2M device 302, a base station 304 and an M2M server or other network entity 306. At 308, mobility and/or traffic pattern characteristics of M2M device 302 may be transmitted from M2M server 306 to base station 304. At 310 (which may occur before or after 308), M2M device 302 and base station 304 may implement an "initial" network entry.

During the initial network communication or at some later time, at 312, base station 304 may transmit a network reentry procedure request to M2M device 302. The request may include a particular reentry procedure M2M device 302 should use upon reentering a network. Examples of network reentry procedures are shown in FIG. 1 and described above. At 314, M2M device 302 may accept or confirm the selected procedure. Later, at 316, M2M device 302 may utilize that procedure upon reentry to the network.

In various embodiments, a RAN such as a base station may determine traffic pattern mobility characteristics associated with an M2M device statistically. For example, a base station may, over time, collect data relating to a particular M2M device, e.g., from its own communications with the M2M device. The base station may be configured to statistically analyze this data to determine the mobility and/or traffic pattern characteristics of the M2M device.

Figure 4:
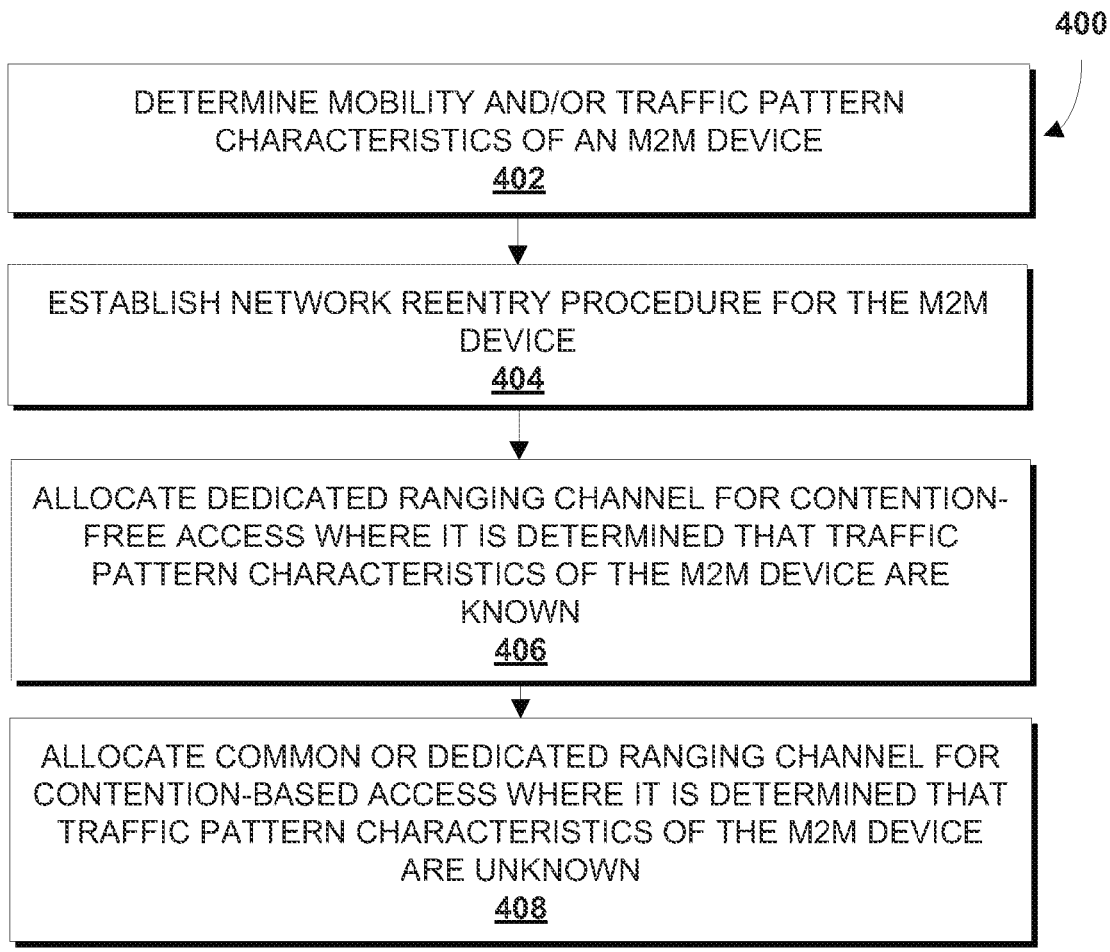
FIG. 4 schematically depicts an example method, in accordance with various embodiments.

An example method 400 that may be implemented on a RAN such as a base station (e.g., 204, 304) is shown in FIG. 4. At 402, mobility and/or traffic pattern characteristics of an M2M device may be determined. In various embodiments, determining mobility and/or traffic pattern characteristics of an M2M device may include receiving, by a RAN such as a base station, a transmission that includes the mobility and/or traffic pattern characteristics of the M2M device. For instance, in some embodiments, the mobility and/or traffic characteristics may be determined by another network entity such as an M2M server (e.g., 306) and transmitted to the RAN. In some embodiments, the mobility and/or traffic characteristics may be determined by an M2M device and transmitted to a RAN, e.g., as part of a network reentry procedure request. In other embodiments, a RAN such as a base station (e.g., 204, 304) may determine the characteristics itself, e.g., statistically based on data collected by the RAN.

At 404, a network reentry procedure for the M2M device may be established based at least in part on the mobility and/or traffic pattern characteristics. In various embodiments, the reentry procedure may be established by a RAN such as a base station. In some embodiments, an M2M device may determine which reentry procedure is appropriate, e.g., based on its mobility and/or traffic pattern characteristics, and request that procedure from a RAN.

At 406, a dedicated ranging channel for contention-free access may be allocated, e.g., by a base station (e.g., 204, 304), to an M2M device or a group of M2M devices where it is determined that the traffic pattern characteristics of the M2M device are known. At 408, in contrast, a common or dedicated ranging channel for contention-based access may be allocated, e.g., by a base station (e.g., 204, 304), to an M2M device or a group of M2M devices where it is determined that the traffic pattern characteristics of the M2M device are unknown.

Figure 5:
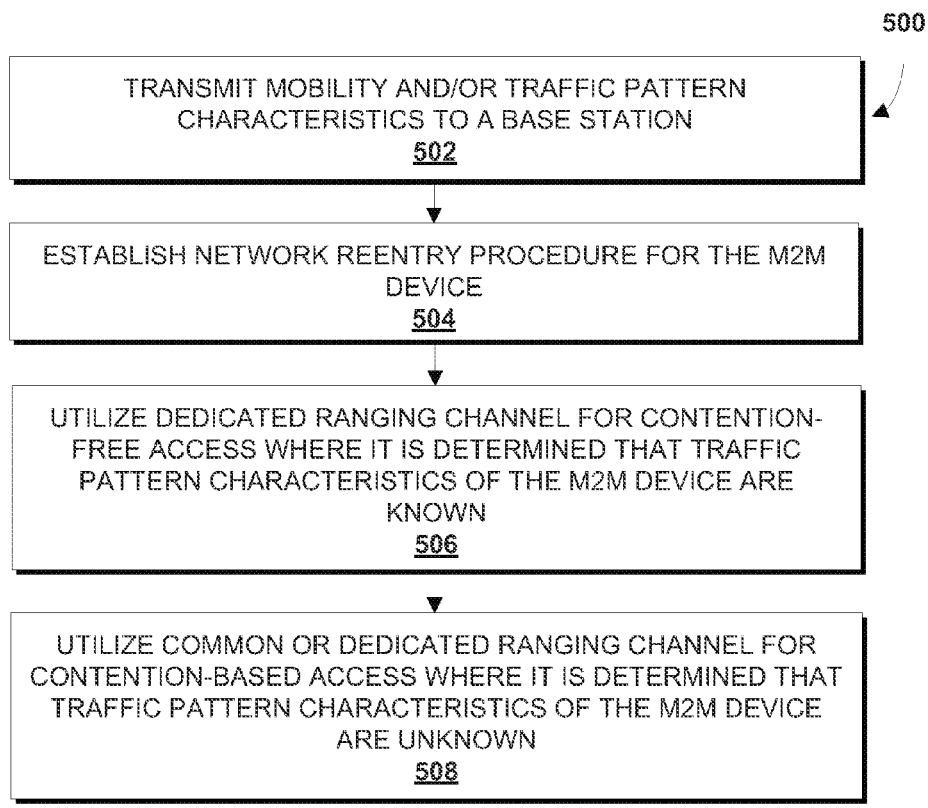
FIG. 5 schematically depicts another example method, in accordance with various embodiments.

An example method 500 that may be implemented on an M2M device is shown in FIG. 5. At 502, an M2M device may transmit, to a RAN such as a base station, mobility and/or traffic pattern characteristics of the M2M device. At 504, a network reentry procedure may be established, e.g., by the M2M device, with the base station. In various embodiments, the network reentry procedure may be based at least in part on the mobility and/or traffic pattern characteristics. At 506, the M2M device may utilize a dedicated ranging channel for contention-free access, which may be allocated by the base station, where it is determined that the traffic pattern characteristics of the M2M device are known. At 508, in contrast, the M2M device may utilize a common or dedicated ranging channel for contention-based access, which may be allocated by the base station, where it is determined that the traffic pattern characteristics of the M2M device are unknown.

Figure 6:
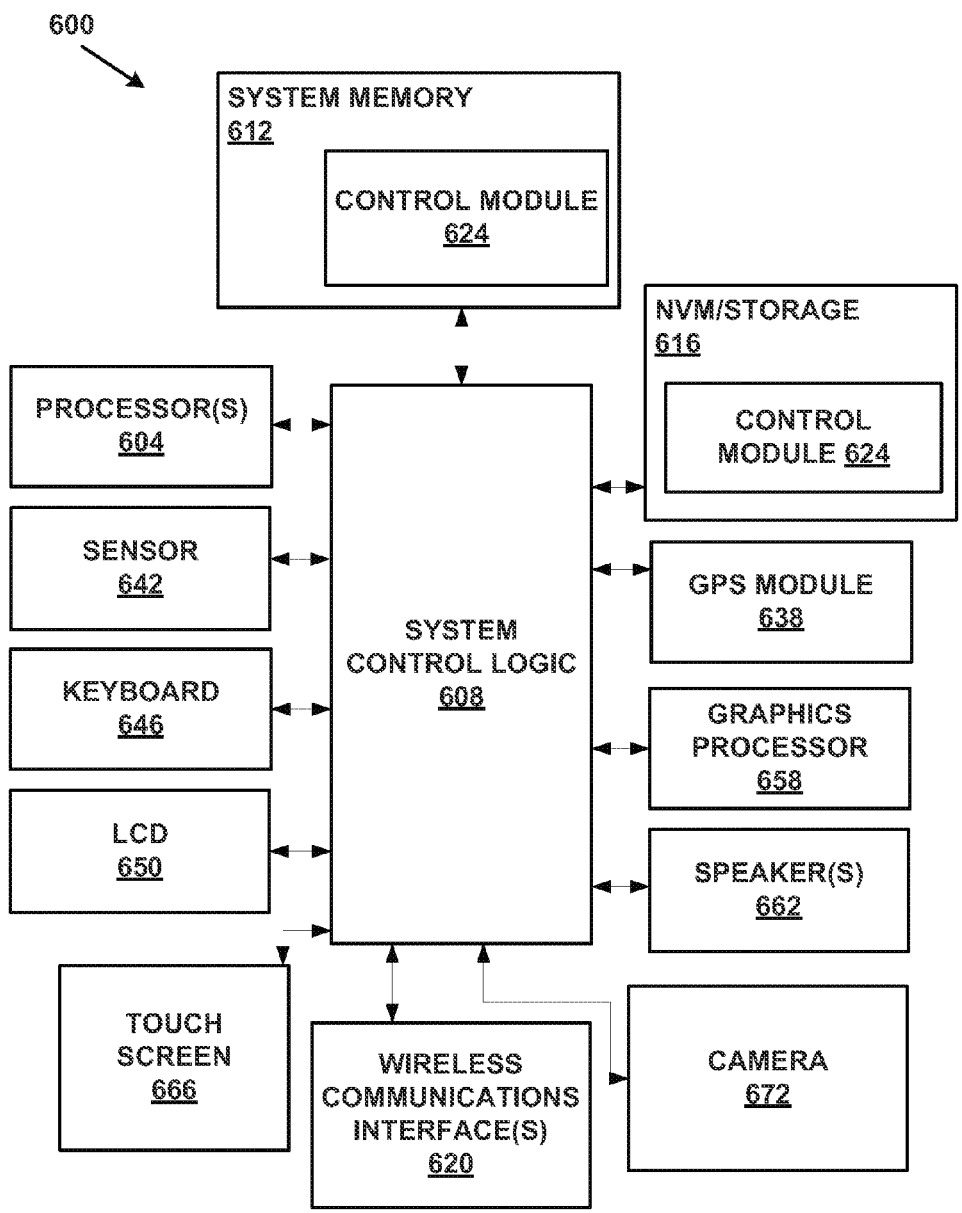
FIG. 6 schematically depicts an example system, in accordance with various embodiments.

The techniques and apparatuses described herein may be implemented into a system using suitable hardware and/or software to configure as desired. FIG. 6 illustrates, for one embodiment, an example wireless communication device in the form of a system 600 comprising one or more processor(s) 604, system control logic 608 coupled to at least one of the processor(s) 604, system memory 612 coupled to system control logic 608, non-volatile memory (NVM)/storage 616 coupled to system control logic 608, and one or more wireless communications interface(s) 620 coupled to system control logic 608.

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory ("DRAM"), for example.

System control logic 608 for one embodiment may include one or more input/output ("I/O") controller(s) to provide an interface to NVM/storage 616 and wireless communications interface(s) 620.

NVM/storage 616 may be used to store data and/or instructions, for example. NVM/storage 616 may include any suitable non-volatile memory, such as flash memory, for example, and/or may include any suitable non-volatile storage device(s), such as one or more hard disk drive(s) ("HDD(s)"), one or more solid-state drive(s), one or more compact disc ("CD") drive(s), and/or one or more digital versatile disc ("DVD") drive(s) for example.

The NVM/storage 616 may include a storage resource physically part of a device on which the system 600 is installed or it may be accessible by, but not necessarily a part of, the device. For example, the NVM/storage 616 may be accessed over a network via the wireless communications interface(s) 620.

System memory 612 and NVM/storage 616 may include, in particular, temporal and persistent copies of control module 624, respectively. The control module 624 may include instructions that when executed by at least one of the processor(s) 604 result in the system 600 establishing and/or implementing network reentry procedures, as described above. In some embodiments, the control module 624 may additionally/alternatively be located in the system control logic 608.

Wireless communications interface(s) 620 may provide an interface for system 600 to communicate over one or more network(s) and/or with any other suitable device. Wireless communications interface(s) 620 may include any suitable hardware and/or firmware, such as a wireless network adapter. The wireless communications interface(s) 620 may use one or more antenna(s).

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package ("SiP"). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip ("SoC").

The system 600 may be a desktop or laptop computer, a base station, an eNB, a mobile telephone, a smart phone, a tablet, a set top box, a game console, or any other device adapted to transmit or receive a wireless communication signal. In various embodiments, system 600 may have more or less components, and/or different architectures. For example, in FIG. 6, system 600 includes a global positioning system ("GPS") module 638, a sensor 642, a keyboard 646, a liquid crystal display ("LCD") screen 650 determine a location of system 600, a graphics processor 658, speakers 662, a touch screen 666 (which in some cases may be the same as LCD display 650), and a camera 672 that may be operated by the processor to capture images for storage in NVM/storage 616. The sensor 642 may sense any number of conditions, such as weather conditions, temperature, assembly line conditions, and so forth, and report the sensed conditions to an application server, periodically, by request or whenever the condition meets a particular criterion (e.g., a temperature threshold).

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. A wireless communication device, comprising:
a processor;
a wireless communication interface;
memory coupled to the processor; and
a control module to be operated by the processor and configured to establish a reentry procedure for a machine-to-machine ("M2M") device to reenter a wireless communication network based on traffic pattern characteristics or mobility characteristics associated with the M2M device, wherein the traffic pattern characteristics indicate a known or unknown traffic pattern and the mobility characteristics indicate that the M2M device is fixed or mobile.

2. The wireless communication device of claim 1, wherein the control module is configured to establish the reentry procedure based on mobility characteristics associated with the M2M device and is further configured to determine that the mobility characteristics indicate the M2M device is mobile or fixed.

3. The wireless communication device of claim 2, wherein the control module is further configured to determine that the mobility characteristics indicate the M2M device is fixed and identify a control channel as part of the reentry procedure.

4. The wireless communication device of claim 3, wherein the control module is further configured to establish a dedicated control channel without using a random access preamble or ranging code to identify the control channel.

5. The wireless communication device of claim 1, wherein the control module is configured to establish the reentry procedure based on the traffic pattern characteristics and the control module is further configured to determine that the traffic pattern characteristics are a known or unknown traffic pattern.

6. The wireless communication device of claim 5, wherein the control module is further configured to establish, based on a determination that traffic pattern characteristics are a known pattern, a dedicated ranging channel as part of the reentry procedure to facilitate contention-free access.

7. The wireless communication device of claim 5, wherein the control module is further configured to use group paging as a polling mechanism of the reentry procedure based on determination that traffic pattern characteristics are a known pattern.

8. The wireless communication device of claim 5, wherein the control module is further configured to establish, based on a determination that traffic pattern characteristics are an unknown pattern, a dedicated ranging channel as part of the reentry procedure to facilitate contention-based access.

9. The wireless communication device of claim 1, wherein the control module is further configured to transmit to the M2M device, over the wireless communication interface, a network reentry procedure request.

10. The wireless communication device of claim 1, wherein the control module is further configured to receive from the M2M device, over the wireless communication interface, a network reentry procedure request.

11. The wireless communication device of claim 10, wherein the control module is further configured to receive from the M2M device, over the wireless communication interface, data indicative of the traffic pattern characteristics or the mobility characteristics associated with the M2M device.

12. The wireless communication device of claim 1, wherein the control module is further configured to receive, from a network entity hosting an M2M service, data indicative of the traffic pattern characteristic or the mobility characteristic associated with the M2M device.

13. The wireless communication device of claim 1, wherein the control module is further configured to determine the traffic pattern characteristic or the mobility characteristic associated with the M2M device statistically using data collected by the wireless communication device.

14. The wireless communication device of claim 1, wherein the control module is configured to send or receive, over the wireless communication interface, a MOB_PAG-ADV or AAI-PAG-ADV message with a field indicating the established network reentry procedure.

15. A machine-to-machine ("M2M") device, comprising:
a processor;
a wireless communication interface;
memory coupled to the processor; and
a control module to be operated by the processor and configured to select a reentry procedure from a plurality of reentry procedures for use by the M2M device to reenter a wireless communication network, wherein the selection is based on traffic pattern characteristics and mobility characteristics associated with the M2M device, wherein the traffic pattern characteristics indicate a known or unknown traffic pattern and the mobility characteristics indicate that the M2M device is fixed or mobile.

16. The M2M device of claim 15, wherein the control module is configured to determine that the mobility characteristics indicate the M2M device is mobile or fixed.

17. The M2M device of claim 16, wherein the control module is further configured to determine that the mobility characteristics indicate the M2M device is fixed and the control module is further configured to initiate a ranging process as part of the selected reentry procedure.

18. The M2M device of claim 17, wherein the control module is further configured to establish a dedicated ranging channel where no ranging code is used with the ranging process.

19. The M2M device of claim 15, wherein the control module is configured to determine that the traffic pattern characteristics are a known or unknown traffic pattern.

20. The M2M device of claim 19, wherein the control module is further configured to establish, based on a determination that traffic pattern characteristics are a known pattern, a dedicated ranging channel as part of the selected reentry procedure to facilitate contention-free access.

21. The M2M device of claim 19, wherein the control module is further configured to use group paging as a polling mechanism of the selected reentry procedure based on determination that traffic pattern characteristics are a known pattern.

22. The M2M device of claim 19, wherein the control module is further configured to utilize, based on a determination that traffic pattern characteristics are an unknown pattern, a dedicated ranging channel as part of the selected reentry procedure to facilitate contention-based access.

23. The M2M device of claim 15, wherein the control module is further configured to receive from a base station, over the wireless communication interface, a network reentry procedure request.

24. The M2M device of claim 15, further comprising a global positioning system module.

25. The M2M device of claim 15, further a comprising a sensor configured to sense weather conditions, temperature or assembly line conditions.

26. The M2M device of claim 15, further comprising a camera that is operable by the processor to capture images for storage in the memory.

27. The M2M device of claim 15, wherein the control module is configured to send or receive, over the wireless communication interface, a MOB_PAG-ADV or AAI-PAG-ADV message with a field indicating the established network reentry procedure.

28. A computer-implemented method, comprising:
determining, by a base station, mobility and/or traffic pattern characteristics of a machine-to-machine ("M2M") device; and
establishing, by the base station, a network reentry procedure for the M2M device based at least in part on the mobility and/or traffic pattern characteristics, wherein the traffic pattern characteristics indicate a known or unknown traffic pattern and the mobility characteristics indicate that the M2M device is fixed or mobile.

29. The computer-implemented method of claim 28, wherein determining mobility and/or traffic pattern characteristics of an M2M device comprises receiving, by the base station, from the M2M device or a M2M server on the network, a transmission that includes the mobility and/or traffic pattern characteristics of the M2M device.

30. The computer-implemented method of claim 28, further comprising sending or receiving, by the base station, a MOB_PAG-ADV or AAI-PAG-ADV message with a field indicating the established network reentry procedure.

* * * * *